United States Patent Office 3,728,258
Patented Apr. 17, 1973

3,728,258
SELF-EXTINGUISHING FLAMMABLE MIXTURES
William L. Livingston, Sharon, Mass., assignor to Factory Mutual Research Corporation, Norwood, Mass.
No Drawing. Filed June 2, 1971, Ser. No. 149,355
Int. Cl. C09k 3/28
U.S. Cl. 252—8.1                                    4 Claims

ABSTRACT OF THE DISCLOSURE

Self-extinguishing flammable mixtures are produced and a method provided for reducing the hazards associated with the transportation of flammable liquids. Flammable liquid is mixed with a water microgel system so that the liquid is present in an amount of between 5% to 30% by weight, based on the total weight of the mixture. The resulting mixture may be transported by any suitable means. When the mixture reaches its ultimate destination the two components may be separated by gravitational means such as centrifugation.

BACKGROUND OF THE INVENTION

This invention relates to self-extinguishing flammable mixtures and to a method for treating flammable liquids so as to reduce the hazards associated with their transportation.

The dangers connected with the transportation of flammable liquids, including liquid fuels such as gasoline and fuel oil, are of constant concern to the public and industry alike. Serious fires and explosions, often resulting in death, have occurred in the past with unacceptable frequency. In most cases such disasters resulted from ignition of the flammable liquids which spilled from a leak or rupture in the delivery system. The hazards which exist in such a situation are particularly grave when the leak or rupture occurs in a populated or well-traveled area where the chance of ignition is considerably greater than in a desolate place. The threat to property and human life which exists under such circumstances suggests the great importance of discovering a means to prevent the uncontrolled ignition of flammable liquids.

Through the years there has been considerable interest in emulsifying fuels to increase their stability and prevent explosions but in each case a permanent emulsion was produced and the emulsifying agent was consumed along with the fuel when it was burned. Some early workers in this art produced oil and water emulsions with water in the continuous phase but such emulsions were extremely difficult to ignite and to keep burning. Later work was concerned with emulsions wherein oil was present in the continuous phase but this gave rise to new problems. Invariably, the emulsifying agents caused corrosion of the delivery system and reduced the energy level of the fuel.

More recently a method was suggested for fireproofing gasoline and other fuels by incorporating specific fluorinated hydrocarbons in the fuel and subsequently removing the fluorinated compounds through distillation procedures. However, the expense associated with such separation procedures makes such a process commercially impractical.

SUMMARY OF THE INVENTION

Accordingly, it has now been discovered that transporting flammable liquids in the form of a composite mixture comprising a dispersion of a flammable liquid in a water-microgel system greatly reduces the well-known hazards associated with such an operation. The flammable liquid will constitute between about 5% to 30% by weight of the mixture and ultimately may be separated from the microgel system by a simple centrifugation procedure. The mixtures produced according to this invention are flammable but self-extinguishing.

The presence of a microgel system along with a flammable liquid in the transportation of the fluid and during the separation procedure does not affect the original properties of the liquid. After separation of the two components of the mixture, the water-microgel may be returned for recirculation in a continuous system or reuse in an intermittent form of flammable liquid transportation.

DETAILED DESCRIPTION OF THE INVENTION

As previously mentioned, the mixtures produced according to this invention comprise a water-microgel system and between about 5% to 30% by weight of a flammable liquid.

The water-microgel system is an ablative material, that is, it will absorb thermal energy in its outer surface and dissipate it in the form of steam or vapor so that there is no convection of the heat into its interior portion. Thus, when admixed with a flammable liquid the microgel system will act as an insulator and prevent ignition of the liquid suspended in the mixture. In effect the fuel is encapsulated by the microgel system.

The ablative microgel comprises a water dispersion of a water-swellable polymer. Cross-linked, hydrolyzed, polyacrylamide type polymers having molecular weights ranging from 15,000 to 25,000, the preferred range being 17,500 to 22,500, have been found to be particularly useful. One such material, having an average molecular weight of 20,000 is commercially sold under the trademark Gelgard M, a product of the Dow Chemical Company. Other polymers found to be useful include an ethylene-maleic anhydride cross-linked polymer marketed by Monsanto under its trademark EMA–91 and the diammonium-sodium salt of such a polymer sold under the designation EMA–94. Other suitable polymers include a cross-linked compound marketed by the B. F. Goodrich Chemical Company as Carbopol-960, and those materials disclosed in U.S. Pats. 3,229,769 to Bashaw et al. and 3,354,084 to Katzer. Such polymeric materials are generally solids and may be mixed with an apropriate amount of water by any conventional means. The polymer will ordinarily be present in the microgel system in concentrations from 1 to 4 parts per thousand by weight. Preferably, the gelling agent will be present in an amount between 0.1 to 0.3% by weight, based on the total weight of the microgel system. In the most desired form the polymer will constitute about 0.2% by weight of the system. The upper limit is a practical one, since the use of a gelling agent about 0.3% by weight is not only too expensive but, with at least certain of the gelling agents employable in this invention, a gel may be produced which is too viscous for practical use. Care should be taken in preparing the microgel system of this invention to insure a homogeneous preparation. Toward this end, it is desirable to use a gelling agent in a finely divided powder form to facilitate mixing with water. A particulate form conveniently utilized herein has an average particle size ranging from through 50 mesh to through 325 mesh, preferably from through 230 mesh to through 325 mesh, U.S. Standard Sieve Series. The water-microgel may be mixed with a flammable liquid by any suitable means such as a conventional blade type mixer. When prepared, the flammable liquid will constitute from about 5% to 30% by weight of the mixture and may be transported in that form in any of the fuel transportation systems presently known. For example, crude oil containing gasoline, fuel oil and other fractions may be mixed with a microgel system according to this invention and transported through a pipeline to an ultimate refining operation. When such a mixture reaches its destination, the water-microgel may be easily separated from the oil by a simple centrifugation whereupon the microgel may be recycled for additional oil transportation. The transportation of any known flammable liquid may be accomplished in a similar fashion. Any conventional means for gravitational separation of the mixture components may be employed. A cyclone separator has been used with particular effectiveness.

In the event of a leak or rupture in the fuel transportation system the spilled flammable liquid-water-microgel mixture may ignite. However, as soon as the exposed surface globules of the fuel are consumed, the combustion will stop. The heat of ignition will not be transmitted to the interior of the microgel system encasing the bulk of existing flammable liquid.

In order to further illustrate the present invention an ablative microgel was prepared by forming an aqueous suspension of 2.5 parts per thousands by weight of Gelgard M fines. Gelgard M is a trademark of the Dow Chemical Company for cross-linked, hydrolyzed polyacrylamide type polymers which were previously described. 0.7 gallon of the microgel was mixed with 0.3 gallon of regular gasoline using a conventional laboratory stirring impeller until the mixture was homogeneous and stable, that is, until there was no apparent film of gasoline on the surface of the mixture. The mixture was dumped on a cement floor, so that it covered an area of approximately 4 square feet, and ignited whereupon it burned readily for approximately 5 seconds, quickly subsided and was completely out in 15 seconds. Additional exposure flames were applied to the residual material with a propane torch but no apparent ignition occurred even when the torch was held on one spot for several minutes. Thus, the microgel was effective in masking at least a portion of the flammable gasoline and endured direct exposure to flames without becoming involved in the burning.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A self-extinguishing flammable mixture comprising an ablative water-microgel system, said water-microgel system being a homogeneous dispersion of a water-swellable polymer in water, and between about 5% to 30% by weight of a flammable liquid.

2. A self-extinguishing flammable mixture as defined in claim 1 wherein said water-swellable polymer is present in a proportion of from 1 to 4 parts per thousand weight of water.

3. A self-extinguishing flammable mixture comprising an ablative microgel containing between about 0.1 to 0.5% by weight of a water-swellable cross-linked polymer in a water vehicle, and between about 5% to 30% by weight of a flammable liquid fuel.

4. A method for reducing the hazards associated with combustion of flammable liquids during transportation which comprises providing an ablative water-microgel system comprising a water dispersion of a water-swellable polymer, mixing said water-microgel system with between about 5% to 30% by weight of a flammable liquid so as to provide a homogeneous dispersion.

References Cited

UNITED STATES PATENTS

| | | | |
|---|---|---|---|
| 1,394,060 | 10/1921 | Bates | 44—51 |
| 2,254,469 | 9/1941 | Bjorksten | 8—8.1 |

GEORGE F. LESMES, Primary Examiner

W. R. DIXON, Jr., Assistant Examiner

U.S. Cl. X.R.

137—1; 260—29.6 H